United States Patent
Hwang et al.

(10) Patent No.: US 12,075,416 B2
(45) Date of Patent: Aug. 27, 2024

(54) METHOD AND DEVICE FOR TRANSMITTING SCI IN NR V2X

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/636,341

(22) PCT Filed: Aug. 25, 2020

(86) PCT No.: PCT/KR2020/011299
§ 371 (c)(1),
(2) Date: Feb. 17, 2022

(87) PCT Pub. No.: WO2021/040370
PCT Pub. Date: Mar. 4, 2021

(65) Prior Publication Data
US 2022/0303969 A1    Sep. 22, 2022

Related U.S. Application Data

(60) Provisional application No. 62/892,584, filed on Aug. 28, 2019.

(30) Foreign Application Priority Data

Oct. 17, 2019   (KR) .................. 10-2019-0129183

(51) Int. Cl.
*H04W 72/20*   (2023.01)

(52) U.S. Cl.
CPC ................................. *H04W 72/20* (2023.01)

(58) Field of Classification Search
CPC ....... H04W 72/20; H04W 4/40; H04W 28/26; H04W 92/18; H04L 5/0007; H04L 5/001;
(Continued)

(56) References Cited

U.S. PATENT DOCUMENTS

2019/0373625 A1*  12/2019  Khoryaev ............. H04L 1/0003
2020/0029318 A1*   1/2020  Guo ...................... H04L 1/1822
(Continued)

FOREIGN PATENT DOCUMENTS

WO        2017/176098 A1   10/2017

OTHER PUBLICATIONS

Behrad Toghi et al., "Multiple Access in Cellular V2X: Performance Analysis in Highly Congested Vehicular Networks", IEEE Vehicular Networking Conference, Taipei, Taiwan, Oct. 27, 2018, [retrieved on Oct. 27, 2020], Retrieved from the Internet: <URL: https://arxiv.org/abs/1809.02678v2>, see pp. 1-8.
(Continued)

*Primary Examiner* — Yaotang Wang
(74) *Attorney, Agent, or Firm* — BRYAN CAVE LEIGHTON PAISNER LLP

(57) ABSTRACT

Provided are a method for a first device to perform wireless communication, and a device for supporting same. The method may include the steps of: transmitting first sidelink control information (SCI) on a first resource through a first physical sidelink control channel (PSCCH); transmitting second SCI on the first resource through a first physical sidelink shared channel (PSSCH) related to the first PSCCH, wherein at least one of the first SCI and the second SCI includes information related to a second resource, and a transport block (TB) is not transmitted through the first PSSCH; transmitting the first SCI on the second resource to a second device through a second PSCCH; and transmitting the second SCI and the TB on the second resource to the
(Continued)

second device through a second PSSCH related to the second PSCCH.

20 Claims, 22 Drawing Sheets

(58) Field of Classification Search
CPC ... H04L 5/0051; H04L 5/0044; H04L 5/0094; H04L 5/0053; H04L 1/0009; H04L 1/0013
See application file for complete search history.

(56) References Cited

U.S. PATENT DOCUMENTS

| | | | | |
|---|---|---|---|---|
| 2020/0228247 A1* | 7/2020 | Guo | .................... | H04W 52/383 |
| 2020/0367204 A1* | 11/2020 | Li | ..................... | H04W 72/0446 |
| 2021/0007096 A1* | 1/2021 | Huang | .................. | H04L 5/0055 |
| 2021/0050979 A1* | 2/2021 | Hui | ....................... | H04W 72/02 |
| 2021/0204250 A1* | 7/2021 | Ashraf | ................. | H04W 72/56 |
| 2021/0306824 A1* | 9/2021 | Li | ........................... | H04W 4/40 |
| 2022/0303985 A1* | 9/2022 | Miao | ................ | H04W 72/0446 |
| 2022/0353846 A1* | 11/2022 | Wang | ................ | H04W 72/0446 |

OTHER PUBLICATIONS

Catt, "Discussion on resource allocation mechanism for sidelink Mode 2 in NR V2X", R1-1908581, 3GPP TSG RAN WG1 Meeting #98, Prague, Czech, Aug. 26-30, 2019, see pp. 1-13.

Kyocera, "Sidelink Physical Layer Structure", R1-1909015, 3GPP TSG RAN WG1 #98, Prague, Czech, Aug. 26-30, 2019, see pp. 1-7 and figure 2.

Qualcomm Incorporated, "Sidelink Resource Allocation Mechanism for NR V2X", R1-1909254, 3GPP TSG RAN WG1 #98, Prague, Czech, Aug. 26-30, 2019, see pp. 1-17.

* cited by examiner (a)

(b)

(a)

(b)

FIG. 13 transmit, to second device,
first SCI informing/indicating whether at least one
of second SCI and/or sidelink data is included
in resources related to PSSCH — S1310

FIG. 14 receive, from first device, first SCI informing/indicating whether at least one of second SCI and/or sidelink data is included in resources related to PSSCH — S1410

METHOD AND DEVICE FOR TRANSMITTING SCI IN NR V2X

This application is the National Stage filing under 35 U.S.C. 371 of International Application No. PCT/KR2020/011299, filed on Aug. 25, 2020, which claims the benefit of and priority to U.S. Provisional Application No. 62/892,584, filed on Aug. 28, 2019 and Korean Application No. 10-2019-0129183, filed on Oct. 17, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in the next-generation system, a transmitting UE may reserve resource(s) for future transmission. For example, the transmitting UE may reserve resource(s) through a PSCCH and/or a PSSCH. If the transmitting UE reserves resource(s) for future transmission through the PSCCH and/or the PSSCH, a method for the transmitting UE to efficiently transmit the PSCCH and/or the PSSCH for resource reservation, and an apparatus supporting the same, needs to be proposed.

Technical Solutions

In one embodiment, a method for performing, by a first device, wireless communication is provided. The method may comprise: transmitting, through a first physical sidelink control channel (PSCCH), a first sidelink control information (SCI) based on a first resources; transmitting, through a first physical sidelink shared channel (PSSCH) related to the first PSCCH, a second SCI based on the first resource, wherein at least one of the first SCI or the second SCI includes information related to a second resource, and wherein a transport block (TB) is not transmitted through the first PSSCH; transmitting, to a second device through a second PSCCH, a first SCI based on the second resource; and transmitting, to the second device through a second PSSCH related to the second PSCCH, a second SCI and the TB based on the second resource.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: transmit, through a first physical sidelink control channel (PSCCH), a first sidelink control information (SCI) based on a first resources; transmit, through a first physical sidelink shared channel (PSSCH) related to the first PSCCH, a second SCI based on the first resource, wherein at least one of the first SCI or the second SCI includes information related to a second resource, and wherein a transport block (TB) is not transmitted through the first PSSCH; transmit, to a second device through a second PSCCH, a first SCI based on the second resource; and transmit, to the second device through a second PSSCH related to the second PSCCH, a second SCI and the TB based on the second resource.

Effects of the Disclosure

The user equipment (UE) may efficiently perform SL communication.

BRIEF DESCRIPTION OF THE DRAWINGS

FIG. 13 shows a method for a first device to transmit, to a second device, a first SCI informing/indicating whether at least one of a second SCI and/or sidelink data is included in resources related to a PSSCH, based on an embodiment of the present disclosure.

FIG. 14 shows a method for a second device to receive, from a first device, a first SCI informing/indicating whether at least one of a second SCI and/or sidelink data is included in resources related to a PSSCH, based on an embodiment of the present disclosure.

DESCRIPTION OF EXEMPLARY EMBODIMENTS

Figure 1:
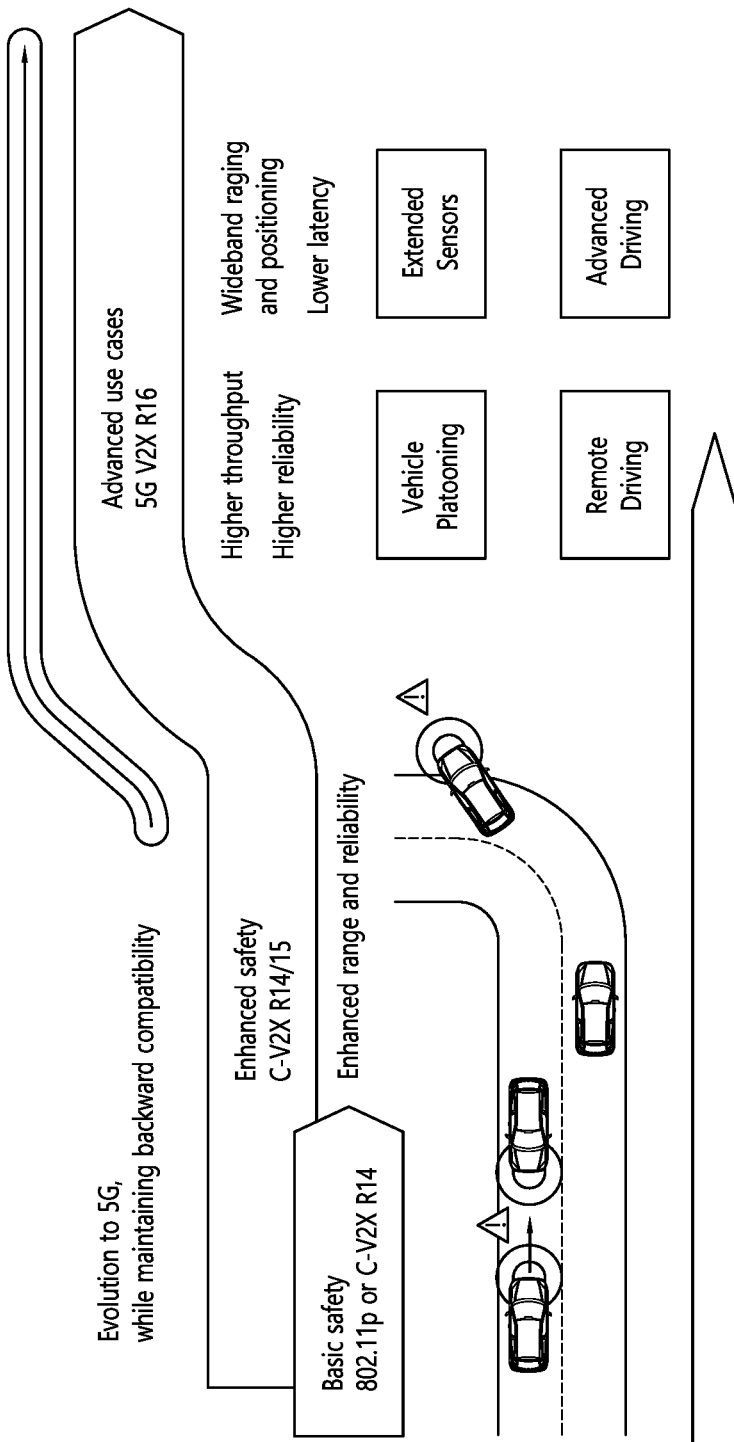
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
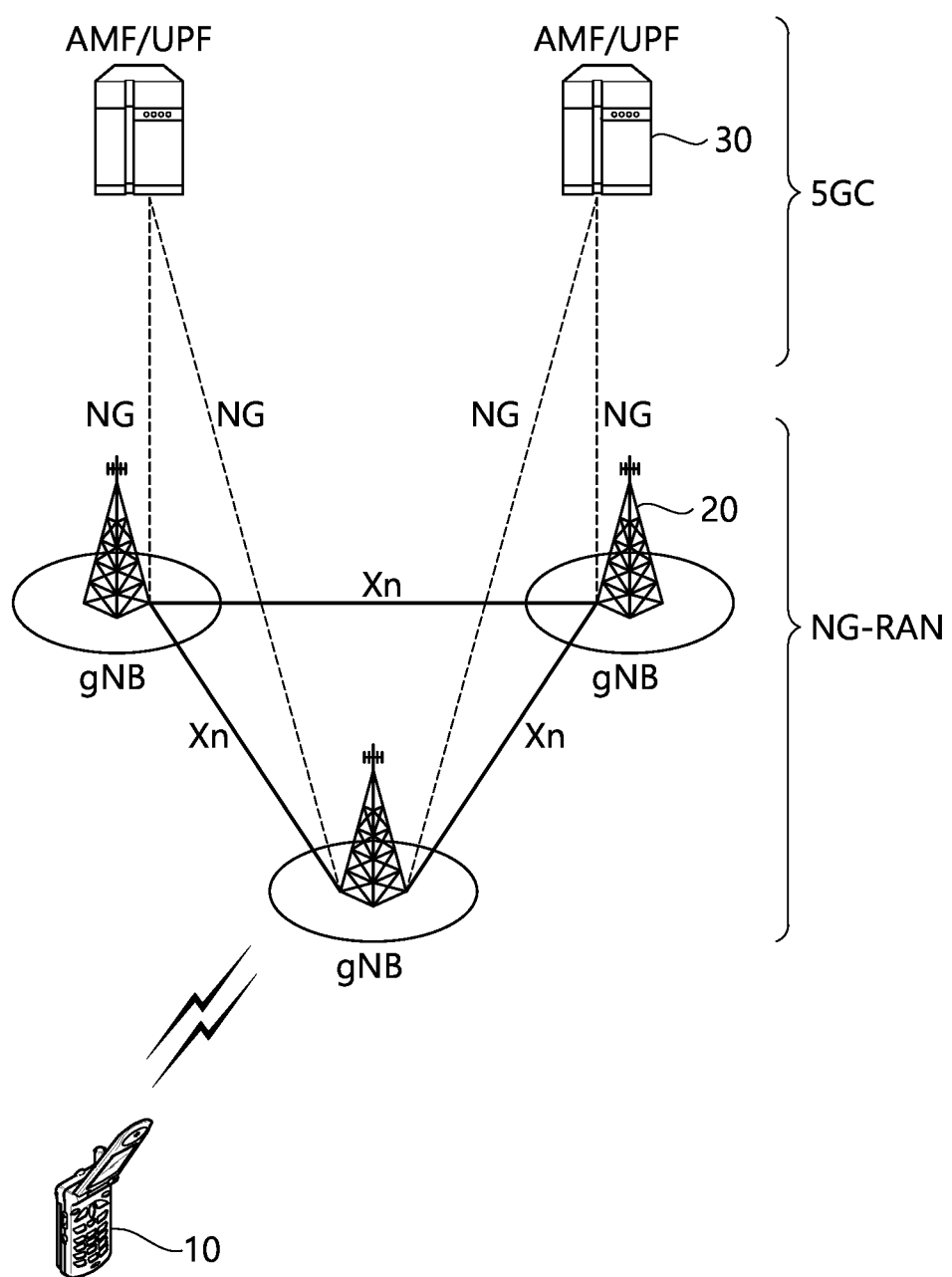
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
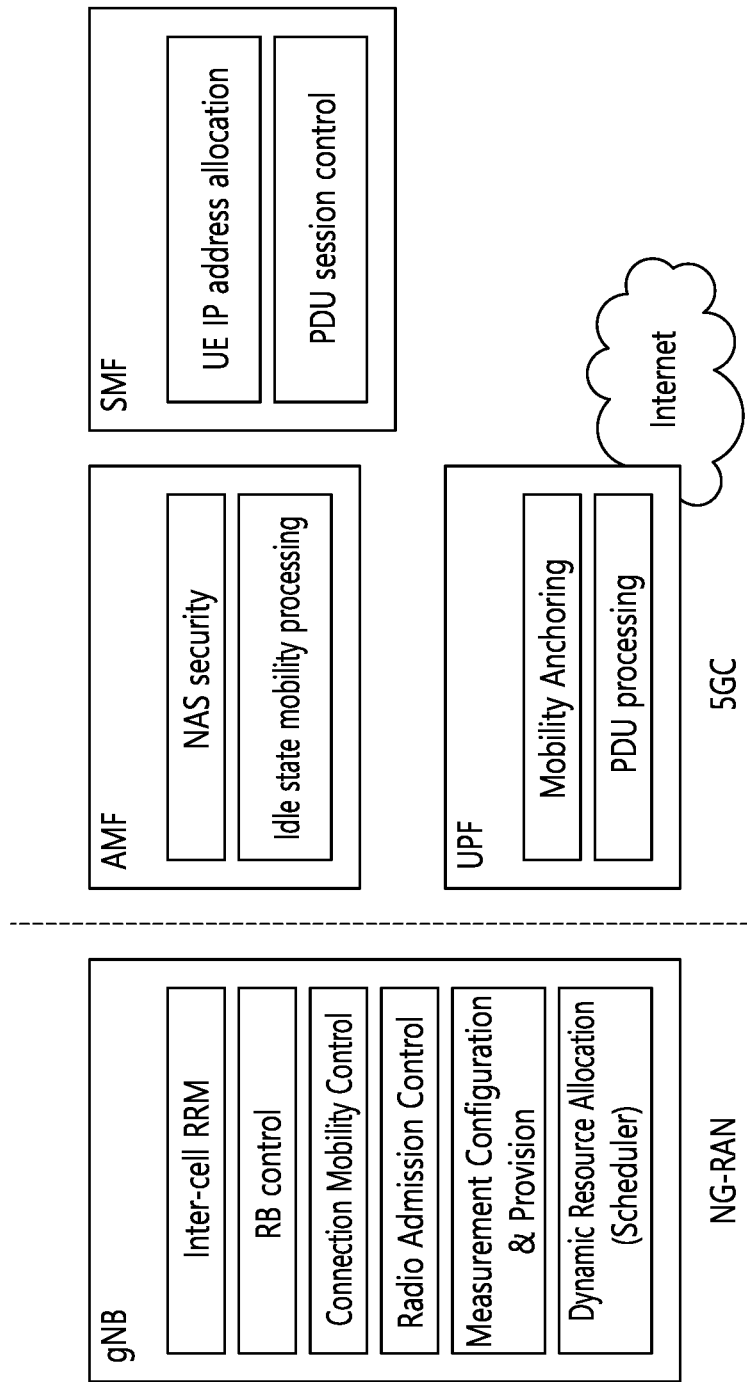
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
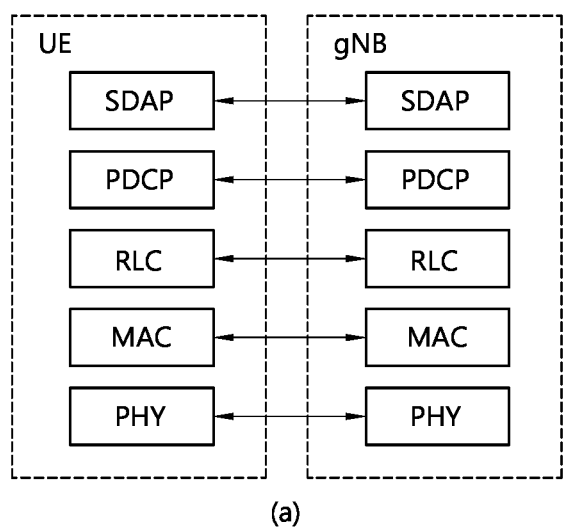
FIG. 4 shows a radio protocol architecture, based on an embodiment of the present disclosure.
Figure 4:
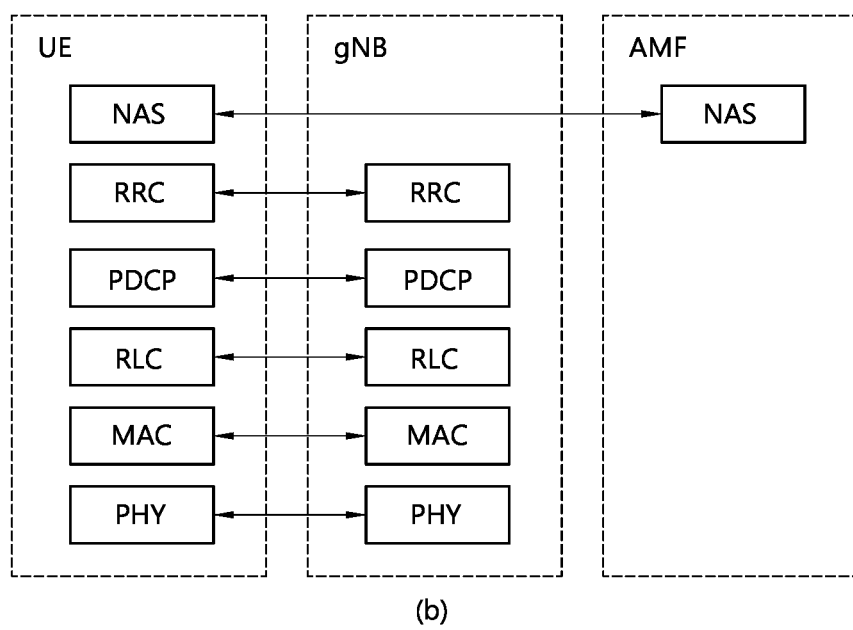

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
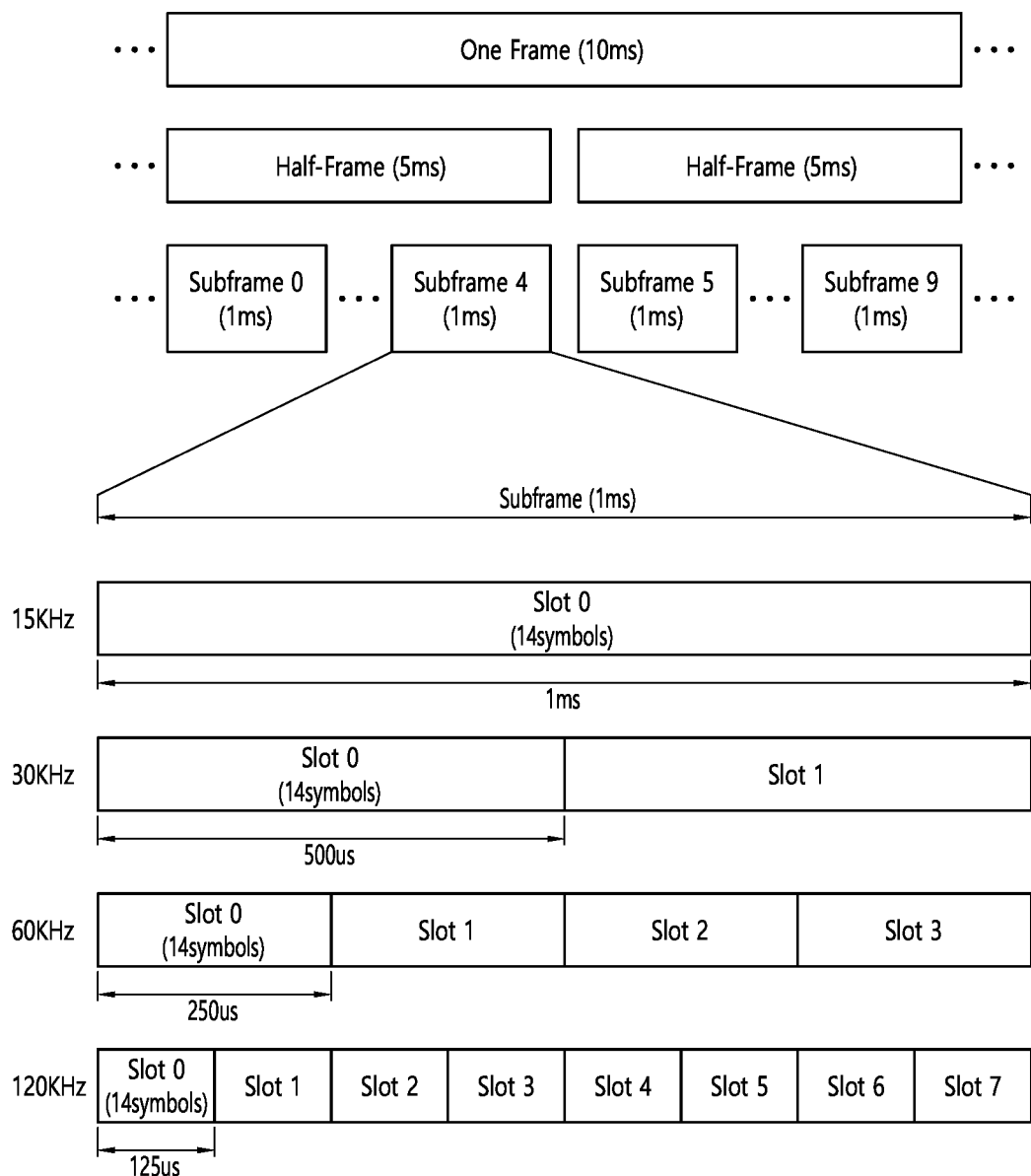
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($Ns^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
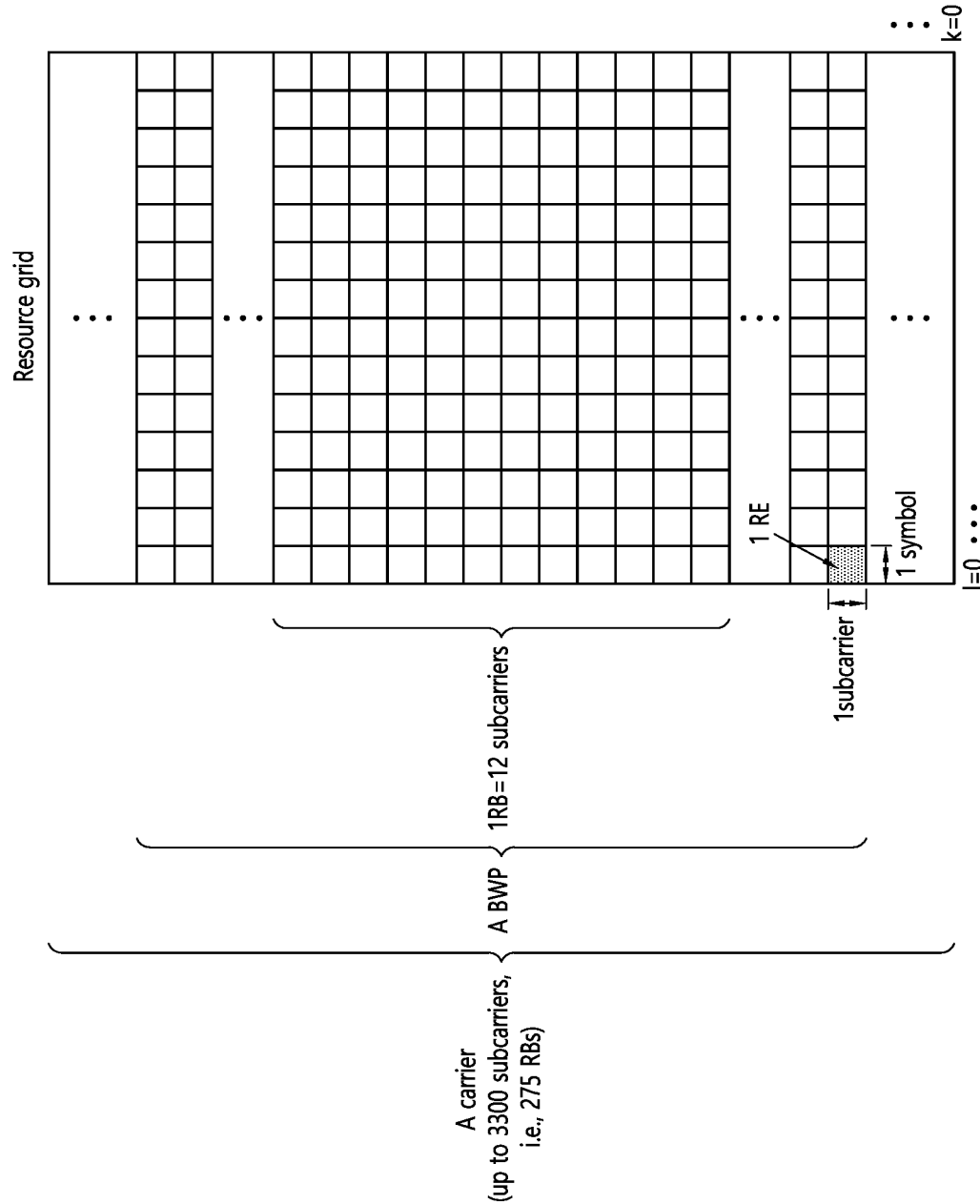
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
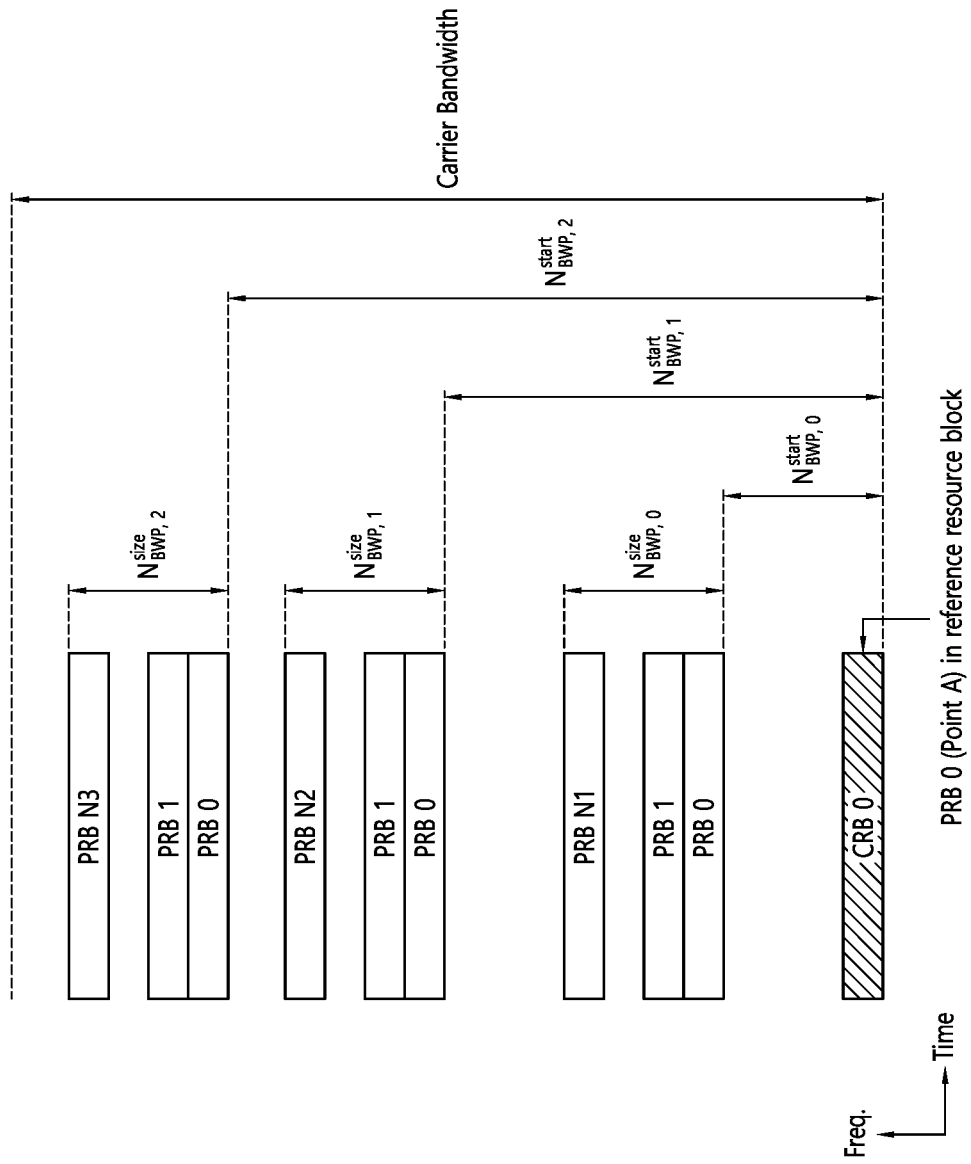
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
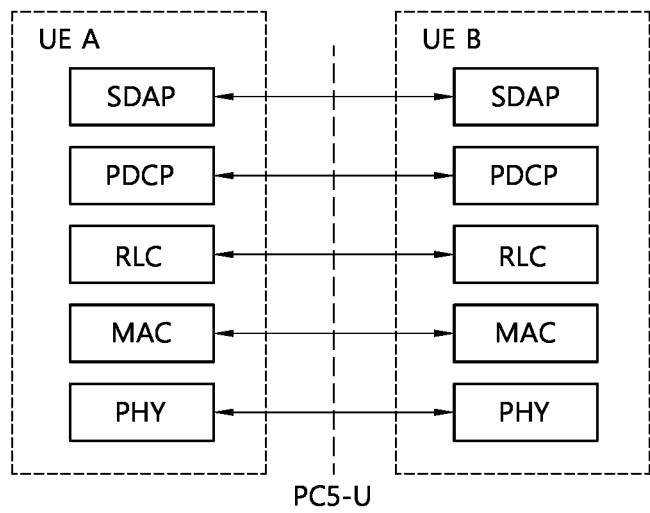
FIG. 8 shows a radio protocol architecture for a SL communication, based on an embodiment of the present disclosure.
Figure 8:
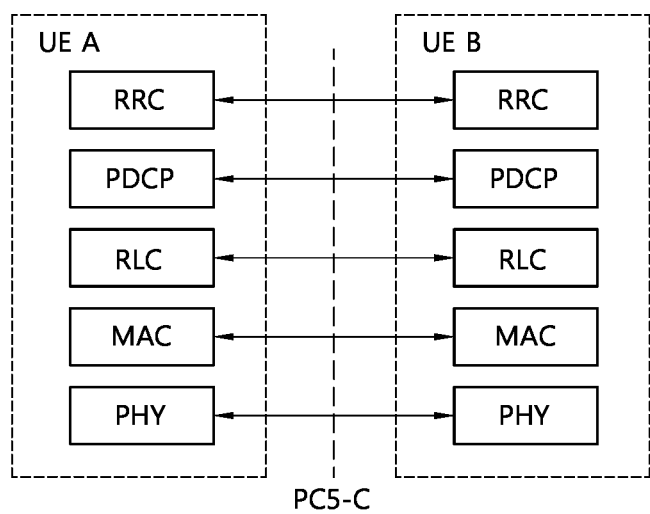

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
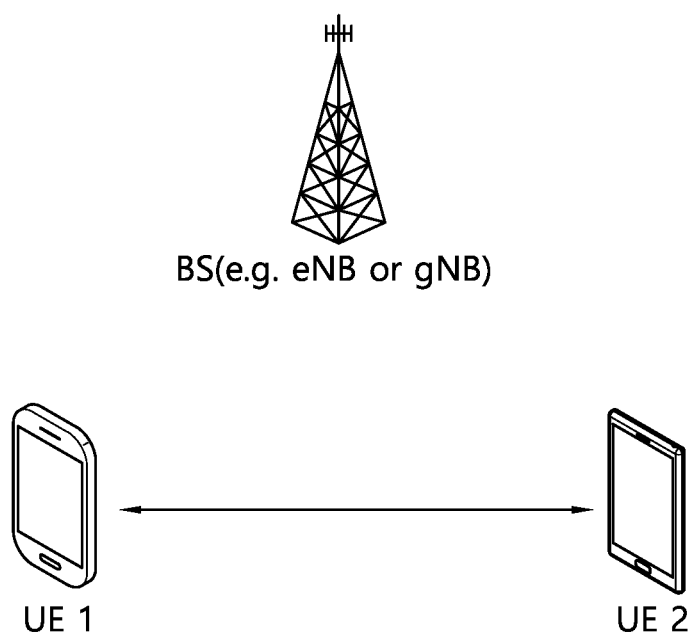
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
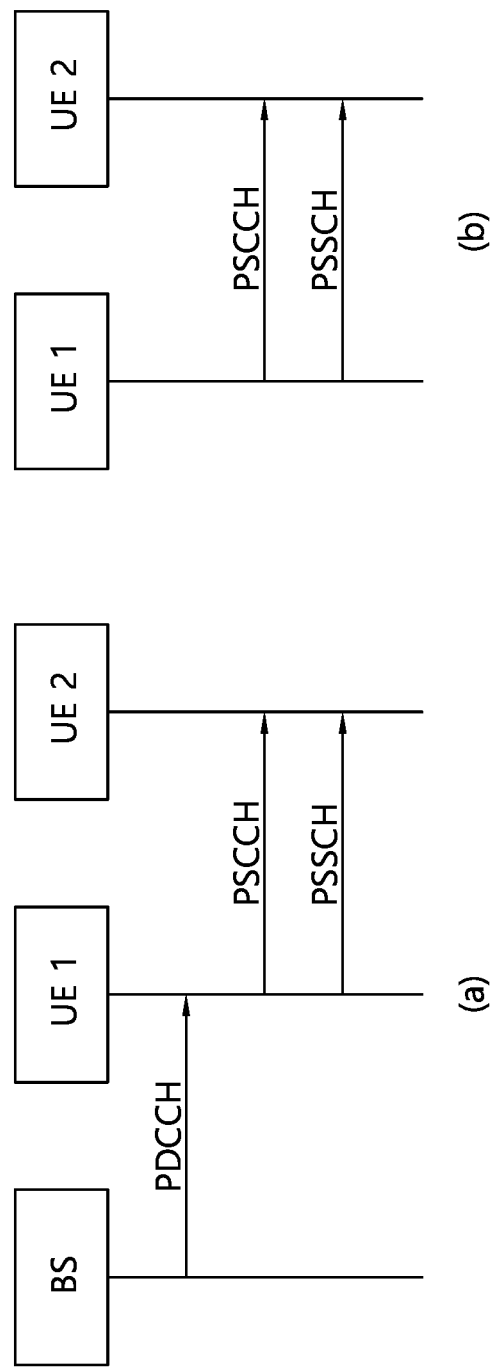
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
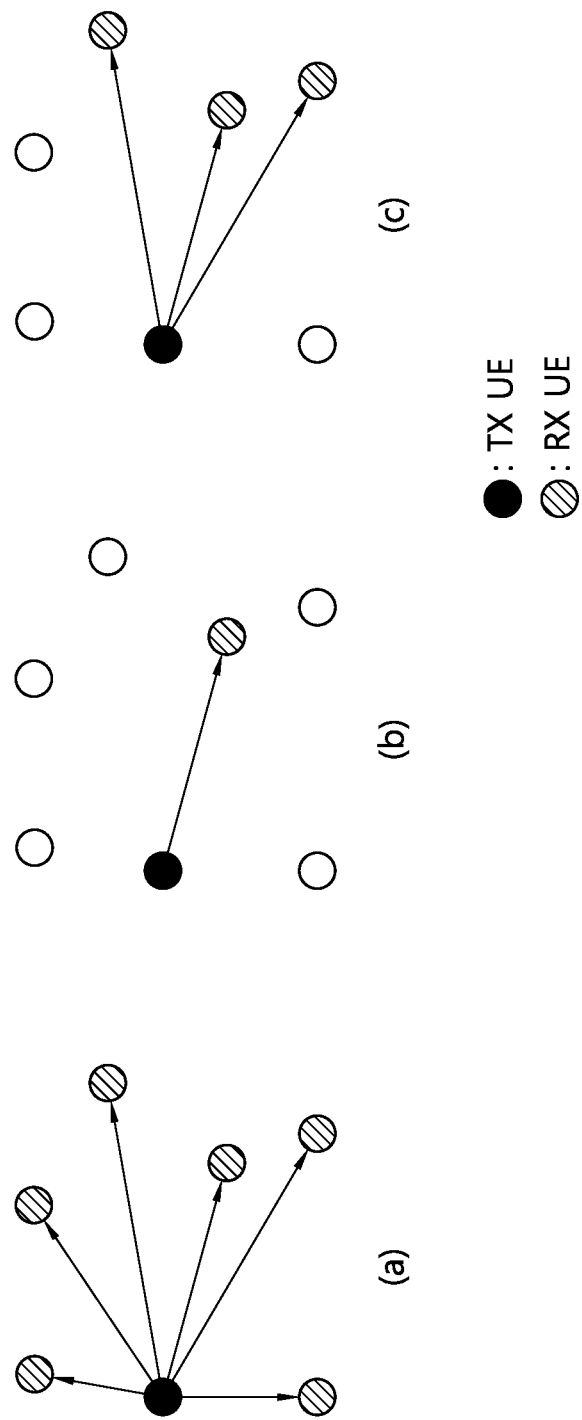
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, a SCI including a first SCI configuration field group may be referred to as a first SCI or a $1^{st}$ SCI, and a SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or Modulation and Coding Scheme (MCS) information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports Location information of a transmitting UE or location (or distance region) information of a target receiving UE (for which SL HARQ feedback is requested), and/or Reference signal (e.g., demodulation reference signal (DMRS), etc.) related to channel estimation and/or decoding of data to be transmitted through a PSSCH, e.g., information related to a pattern of a (time-frequency) mapping resource of DMRS, rank information, antenna port index information, information on the number of antenna ports;

For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, the TX UE may be a UE which transmits SL CSI-RS(s) and/or a SL CSI report request indicator to the (target) RX UE. Additionally/alternatively, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, the RX UE may be a UE which performs SL CSI transmission to the TX UE based on SL CSI-RS(s) and/or a SL CSI report request indicator received from the TX UE. Additionally/alternatively, the RX UE is a UE which transmits a SL (L1) RSRP measurement value, to the TX UE, measured based on (pre-defined) reference signal(s) and/or a SL (L1) RSRP report request indicator received from the TX UE. Additionally/alternatively, the RX UE may be a UE which transmits data of the RX UE to the TX UE. Additionally/alternatively, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

Option 1) NACK information may be transmitted to the TX UE only if the RX UE fails to decode/receive the PSSCH received from the TX UE.

Option 2) If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the term "configure/configured" or the term "define/defined" may refer to (pre)configuration from a base station or a network (through predefined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a code block group (CBG) may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, SL mode 1 may refer to a resource allocation method or a communication method in which a base station directly schedules sidelink transmission (SL TX) resource(s) of a UE through pre-defined signaling (e.g., DCI). Also, for example, SL mode 2 may refer to a resource allocation method or a communication method in which a UE independently selects SL TX resource(s) within a resource pool configured or pre-configured from a base station or a network.

Meanwhile, in the present disclosure, for example, for convenience of description, a (physical) channel used when the RX UE transmits at least one of the following information to the TX UE may be referred to as a PSFCH.

SL HARQ feedback, SL CSI, SL (L1) RSRP

Meanwhile, in the next-generation system, the transmitting UE may reserve resource(s) for future transmission. Meanwhile, the transmitting UE may reserve resource(s) through a PSCCH and/or a PSSCH. More specifically, the transmitting UE may set resources for initial PSCCH transmission and/or initial PSSCH transmission related to resource reservation to be relatively small (e.g., one subchannel), and set resources reserved for future transmission to be relatively large. That is, the amount of resources used for initial transmission may be different from the amount of resources reserved for transmission of the same TB or different TBs.

As described above, in the next-generation system, the transmitting UE may divide a SCI into two parts and transmit it to the receiving UE. For example, the transmitting UE may divide the SCI into a first SCI and a second SCI and transmit the divided SCIs to the receiving UE. More specifically, the transmitting UE may transmit information for a sensing operation, etc., through resources related to a PSCCH. In addition, the transmitting UE may transmit information for PSSCH decoding and/or information for HARQ feedback, etc., other than the information for the sensing operation, through all or some resources related to a PSSCH. In various embodiments of the present disclosure, a SCI transmitted through resources related to a PSCCH may be referred to as a first SCI, a $1^{st}$ SCI, or a $1^{st}$-stage SCI, and a SCI transmitted through all or some resources related to a PSSCH may be referred to as a second SCI, a $2^{nd}$ SCI, or a $2^{nd}$-stage SCI.

Based on an embodiment of the present disclosure, if the UE transmits a PSCCH and/or a PSSCH through the 2-stage SCI, data may not be included in the PSSCH. That is, for example, the UE may use the PSSCH to transmit the $2^{nd}$ SCI. For example, the UE may reserve future (re)transmission resource(s) by using a PSCCH/PSSCH that does not include data. In addition, for example, the UE may transmit an actual TB or data by using the reserved (re)transmission resource(s).

Figure 12:
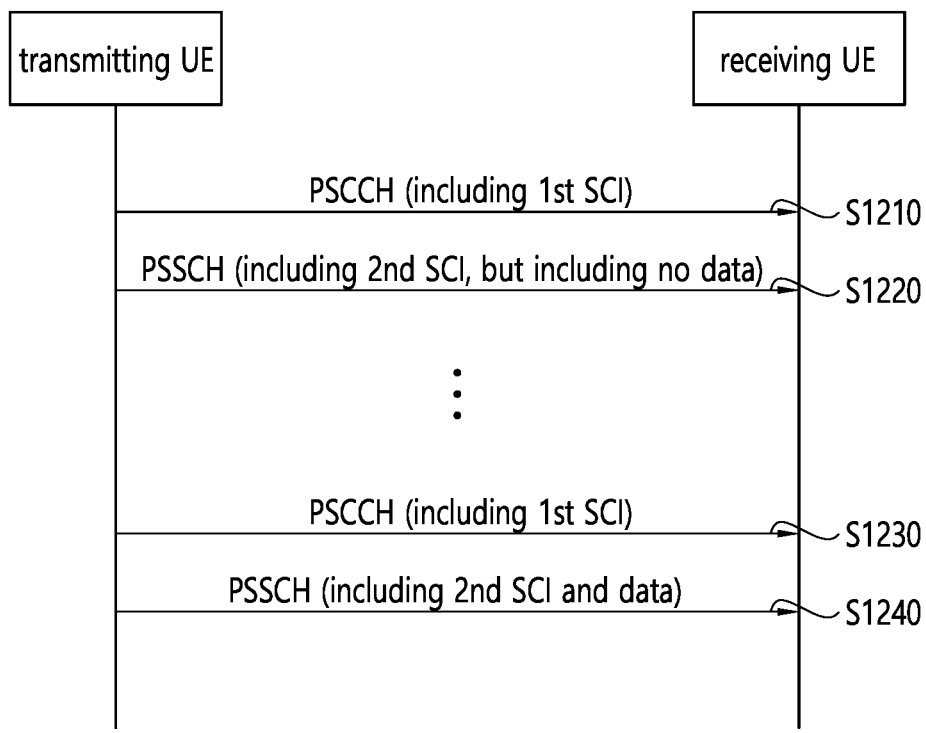
FIG. 12 shows a procedure for a UE to transmit a PSCCH and/or a PSSCH for reserving (re)transmission resource(s), based on an embodiment of the present disclosure.

FIG. 12 shows a procedure for a UE to transmit a PSCCH and/or a PSSCH for reserving (re)transmission resource(s), based on an embodiment of the present disclosure. The embodiment of FIG. 12 may be combined with various embodiments of the present disclosure.

Referring to FIG. 12, in step S1210, a transmitting UE may transmit a $1^{st}$ SCI through a PSCCH. In step S1220, the transmitting UE may transmit a $2^{nd}$ SCI through a PSSCH related to the PSCCH. Herein, the PSSCH may not include data (e.g., MAC PDU). That is, in steps S1210 and S1220, the PSCCH and the PSSCH may not be transmitted for data transmission, but may be transmitted to reserve an initial transmission resource or retransmission resource(s).

In step S1230, the transmitting UE may transmit a $1^{st}$ SCI through a PSCCH. In step S1240, the transmitting UE may transmit a $2^{nd}$ SCI through a PSSCH related to the PSCCH. Herein, the PSSCH may include data (e.g., MAC PDU). That is, in steps S1230 and S1240, the PSCCH and the PSSCH may be transmitted for data transmission. For example, resource(s) used by the transmitting UE to transmit the PSCCH and the PSSCH in steps S1230 and S1240 may be reserved by the PSCCH and the PSSCH transmitted in steps S1210 and S1220.

For example, the transmitting UE may transmit mapping information for a PSSCH to the receiving UE by using a SCI. For example, the transmitting UE may indicate or inform the receiving UE that only a $2^{nd}$ SCI is transmitted through a PSSCH, by using a SCI. For example, the transmitting UE may indicate or inform the receiving UE that only data is transmitted through a PSSCH, by using a SCI. For example, the transmitting UE may indicate or inform the receiving UE that a $2^{nd}$ SCI and data are transmitted through a PSSCH, by using a SCI. Herein, for example, the SCI may be a $1^{st}$ SCI. For example, by using a combination of specific fields of the $1^{st}$ SCI or a separate indication field of the $1^{st}$ SCI, the transmitting UE may indicate or inform the receiving UE whether data exists on a PSSCH and/or whether a $2^{nd}$ SCI exists on a PSSCH. Specifically, for example, by using a $2^{nd}$ SCI indicator, the transmitting UE may indicate or inform the receiving UE whether data exists on the PSSCH and/or whether the $2^{nd}$ SCI exists on the PSSCH. For example, by using a field indicating/informing whether data exists, the transmitting UE may indicate or inform the receiving UE whether data exists on the PSSCH and/or whether the $2^{nd}$ SCI exists on the PSSCH. For example, by using a combination of at least one of modulation and coding scheme (MCS), a redundancy version (RV) value, and/or resource allocation corresponding the transmission, etc., the transmitting UE may indicate or inform the receiving UE whether data exists on the PSSCH and/or whether the $2^{nd}$ SCI exists on the PSSCH.

For example, if one sub-channel is allocated for a PSSCH and MCS=26 and RV=1, the transmitting UE may disable transport block size (TBS) or may not transmit data through the PSSCH. For example, if one sub-channel is allocated for a PSSCH and MCS=26 and RV=1, the receiving UE may assume or determine that the transmitting UE disables TBS or that the transmitting UE does not transmit data through the PSSCH.

For example, in the case of MCS=26 and RV=1, the transmitting UE may disable TBS or may not transmit data through a PSSCH. In addition, the transmitting UE may determine or assume that the PSSCH is used for resource reservation, and may allocate one sub-channel or a relatively small sub-channel for PSSCH transmission. For example, in the case of MCS=26 and RV=1, the receiving UE may assume or determine that the transmitting UE disables TBS or that the transmitting UE does not transmit data through the PSSCH. In addition, the receiving UE determines or assumes that the PSSCH is used for resource reservation, and may receive the PSSCH through one sub-channel or a relatively small sub-channel.

Based on the above-described embodiment, overhead may not occur when the transmitting UE allocates resources. In addition, based on the above-described embodiment, it is possible to reduce the probability that the receiving UE does not receive the initial transmission of the transmitting UE vulnerable to collision. In addition, based on the above-described embodiment, it is possible to solve the problem that it is difficult to guarantee the same TBS in case the amount of reserved resources and the amount of resources are significantly different.

Thereafter, the transmitting UE may initiate data transmission to the receiving UE based on an appropriate MCS value, an appropriate RV value, and/or appropriate resource allocation, etc., by using the reserved resources.

Meanwhile, the transmitting UE may map a $2^{nd}$ SCI to all REs for data mapping in PSSCH resources by performing rate-matching. Specifically, for example, the transmitting UE may start mapping the $2^{nd}$ SCI from a pre-defined location or a (pre-)configured location and map the $2^{nd}$ SCI up to the last symbol of the PSSCH resources, and then may map the $2^{nd}$ SCI to an automatic gain control (AGC) symbol and transmit it to the receiving UE. For example, the AGC symbol may include the first symbol of the PSSCH resources. Specifically, for example, the transmitting UE may map the $2^{nd}$ SCI to the AGC symbol and transmit it to the receiving UE.

Alternatively, for example, the transmitting UE may map a specific value to an AGC symbol and transmit it to the receiving UE. For example, the specific value may be a coded demodulation symbol generated by the transmitting UE through encoding and demodulation by using a zero sequence. Alternatively, for example, the transmitting UE may map the sequence itself before encoding and demodulation to the AGC symbol. Alternatively, for example, the specific value may be a coded demodulation symbol generated by the transmitting UE through encoding and demodulation by using dummy information. Alternatively, for example, the transmitting UE may map the sequence itself before encoding and demodulation to the AGC symbol. More specifically, in this case, in order for the transmitting UE to transmit SL CSI-RS(s), the $2^{nd}$ SCI may be opportunistically punctured in resource(s) through which the SL CSI-RS(s) is transmitted. That is, for example, the transmitting UE may not map the $2^{nd}$ SCI to resource(s) for SL CSI-RS transmission.

For example, the transmitting UE may determine resources to which a $2^{nd}$ SCI is mapped based on the same rule in which the transmitting UE transmits data by using PSSCH resources. That is, the transmitting UE may map the $2^{nd}$ SCI to a part of data REs from among the PSSCH resources and transmit it to the receiving UE. Meanwhile, in order to prevent the receiving UE from performing additional AGC, the transmitting UE may map the $2^{nd}$ SCI to configured and/or indicated PSSCH resources and map a specific value to the remaining resources, and transmit it to the receiving UE. For example, the specific value may be a coded demodulation symbol generated by the transmitting UE through encoding and demodulation by using a zero sequence. Alternatively, for example, the transmitting UE may map the sequence itself before encoding and demodulation to the remaining resources. Alternatively, for example, the specific value may be a coded demodulation symbol generated by the transmitting UE through encoding and demodulation by using dummy information. Alternatively, for example, the transmitting UE may map the sequence itself before encoding and demodulation to the remaining resources.

Meanwhile, for example, if the transmitting UE indicates or informs that there is no data transmitted through a PSSCH, the receiving UE may not perform PSSCH decoding (e.g., LDPC decoding) and/or PSSCH detection even if the receiving UE detects a SCI (e.g., $1^{st}$ SCI and $2^{nd}$ SCI). Additionally/alternatively, for example, if the transmitting UE indicates or informs that only a $2^{nd}$ SCI is transmitted through a PSSCH, the receiving UE may not perform PSSCH decoding (e.g., LDPC decoding) and/or PSSCH detection even if the receiving UE detects a SCI (e.g., $1^{st}$ SCI and $2^{nd}$ SCI). Additionally/alternatively, for example, if a SCI transmitted by the transmitting UE includes resource reservation information, the receiving UE may not perform PSSCH decoding (e.g., LDPC decoding) and/or PSSCH detection even if the receiving UE detects a SCI (e.g., $1^{st}$ SCI and $2^{nd}$ SCI).

For example, if the transmitting UE indicates or informs that there is no data transmitted through a PSSCH, the receiving UE may determine SL HARQ-ACK feedback as NACK and/or DTX even if the receiving UE detects a SCI (e.g., $1^{st}$ SCI and $2^{nd}$ SCI). Additionally/alternatively, for example, if the transmitting UE indicates or informs that only a $2^{nd}$ SCI is transmitted through a PSSCH, the receiving UE may determine SL HARQ-ACK feedback as NACK and/or DTX even if the receiving UE detects a SCI (e.g., $1^{st}$ SCI and $2^{nd}$ SCI). Additionally/alternatively, for example, if a SCI transmitted by the transmitting UE includes resource reservation information, the receiving UE may determine SL HARQ-ACK feedback as NACK and/or DTX even if the receiving UE detects a SCI (e.g., $1^{st}$ SCI and $2^{nd}$ SCI). In this case, the receiving UE may not transmit HARQ-ACK for the control information (e.g., SCI) to the transmitting UE.

Meanwhile, for example, if the transmitting UE indicates or informs that there is no data transmitted through a PSSCH, the receiving UE may determine SL HARQ-ACK feedback as ACK and/or DTX if the receiving UE detects a SCI (e.g., $1^{st}$ SCI and $2^{nd}$ SCI). Additionally/alternatively, for example, if the transmitting UE indicates or informs that only a $2^{nd}$ SCI is transmitted through a PSSCH, the receiving UE may determine SL HARQ-ACK feedback as ACK and/or DTX if the receiving UE detects a SCI (e.g., $1^{st}$ SCI and $2^{nd}$ SCI). Additionally/alternatively, for example, if a SCI transmitted by the transmitting UE includes resource reservation information, the receiving UE may determine SL HARQ-ACK feedback as ACK and/or DTX if the receiving UE detects a SCI (e.g., $1^{st}$ SCI and $2^{nd}$ SCI). In addition, the receiving UE may transmit SL HARQ-ACK feedback to the transmitting UE. In this case, the transmitting UE may check/determine whether the receiving UE has detected the control information (e.g., SCI) including reservation information.

Based on the above-described embodiment, the receiving UE may disable HARQ-ACK feedback for the PSSCH. More specifically, the transmitting UE may directly indicate disabling of the HARQ-ACK feedback through the SCI. Alternatively, for example, the receiving UE may expect/determine that the HARQ-ACK feedback for the PSSCH is disabled.

Based on an embodiment of the present disclosure, the transmitting UE may also transmit data or a TB to the receiving UE, by using a PSCCH/PSSCH which includes resource reservation information or is used for resource reservation. Meanwhile, if the amount of resources for a PSCCH/PSSCH for resource reservation and the amount of resources for a PSCCH/PSSCH for (re)transmission are large, it may be difficult for the transmitting UE to indicate the same TBS. More specifically, the transmitting UE may determine a TBS in consideration of the amount of resources, MCS, specific overheads, etc. In this case, if the number of sub-channels for initial transmission is one and the number of sub-channels for retransmission is ten, basically, the coding rate and/or the data rate indicated by the initial transmission may be 10 times higher than that of the retransmission. Due to this, the peak data rate of the transmitting UE may be unnecessarily limited.

Accordingly, in order to solve the above-mentioned problem, a scaling factor may be introduced. For example, the transmitting UE may calculate/determine a TBS by using the scaling factor. For example, the scaling factor may be used to determine an intermediate value in TBS calculation/determination. The transmitting UE may indicate or inform a scaling factor through a SCI. Alternatively, if the transmitting UE uses a PSCCH/PSSCH for resource reservation, for example, if the transmitting UE uses the PSCCH/PSSCH to indicate future resources including the current resource, a specific scaling factor value may be configured. For example, whether or not the transmitting UE executes the resource reservation operation and/or the scaling factor value may be configured or pre-configured for the transmitting UE for each resource pool.

For example, the scaling factor may be set to the reciprocal of the ratio between the reference number of REs or the number of sub-channels used by the transmitting UE for initial transmission and the reference number of REs or the number of sub-channels used in a part of the reserved resources (e.g., the second reserved resource or the last reserved resource in case the transmitting UE indicates/informs N reserved resources). Through this, even if the amount of resources used by the transmitting UE for initial transmission is small, the transmitting UE may indicate a large TBS. For example, a scaling factor value or candidate values of the scaling factor may be different based on MCS, a service type, a service priority, etc. For example, the scaling factor value or the candidate values of the scaling factor may be different based on the MCS. For example, the scaling factor value or the candidate values of the scaling factor may be different based on the service type. For example, the scaling factor value or the candidate values of the scaling factor may be different based on the service priority. For example, under a condition that a specific scaling factor value is used, resource allocation for initial transmission may be automatically configured. For example, under a condition that a specific scaling factor value is used, resource allocation for initial transmission may be set to one sub-channel.

For example, the reference number of REs referenced by the transmitting UE for TBS calculation/determination may use the number of sub-channels, the reference number of REs per an RB, and/or the reference number of REs of a part of the reserved resources. Through this, even if the amount of resources used by the transmitting UE for initial transmission is small, the transmitting UE may indicate a large TBS. For example, if the transmitting UE indicates/informs N reserved resources, a part of the reserved resources may be the second reserved resource or the last reserved resource among the N reserved resources. For example, a part of the reserved resources may be a reserved resource having the largest reference number of REs. For example, a part of the reserved resources may be a reserved resource having the smallest reference number of REs. For example, a part of the reserved resources may be a reserved resource having the largest number of sub-channels or symbol durations. For example, a part of the reserved resource may be a reserved resource having the smallest number of sub-channels or symbol durations.

For example, if there are a plurality of resources indicated by the transmitting UE, the reference number of REs or the reference number of REs per an RB may be an average value for the plurality of resources. More specifically, the reference number of REs or the reference number of REs per an RB may be an average value among reserved resources excluding initial transmission.

For example, if there are a plurality of resources indicated by the transmitting UE, the reference number of REs or the reference number of REs per an RB may be the sum of the plurality of resources. More specifically, for example, the transmitting UE may set or determine a TBS based on the sum of the reference number of REs for the initial transmission and the second reserved resource. Alternatively, for example, the transmitting UE may set or determine a TBS based on the total sum of the reference number of REs for the reserved resources. Alternatively, for example, the transmitting UE may set or determine a TBS based on the total sum of the reference number of REs for the initial transmission and the reserved resources.

FIG. 13 shows a method for a first device to transmit, to a second device, a first SCI informing/indicating whether at least one of a second SCI and/or sidelink data is included in resources related to a PSSCH, based on an embodiment of the present disclosure. The embodiment of FIG. 13 may be combined with various embodiments of the present disclosure.

Referring to FIG. 13, in step S1310, the first device may transmit, to the second device, the first SCI informing/indicating whether at least one of the second SCI and/or sidelink data is included in resources related to the PSSCH. For example, the first device may inform the second device whether at least one of the second SCI and/or sidelink data is included in resources related to the PSSCH based on various embodiments proposed in the present disclosure. For example, the first SCI may be transmitted by using resources related to a PSCCH. For example, the second SCI may be transmitted by using resources related to the PSSCH.

FIG. 14 shows a method for a second device to receive, from a first device, a first SCI informing/indicating whether at least one of a second SCI and/or sidelink data is included in resources related to a PSSCH, based on an embodiment of the present disclosure. The embodiment of FIG. 14 may be combined with various embodiments of the present disclosure.

Referring to FIG. 14, in step S1410, the second device may receive, from the first device, the first SCI informing/indicating whether at least one of the second SCI and/or sidelink data is included in resources related to the PSSCH. For example, the second device may receive, from the first device, whether at least one of the second SCI and/or sidelink data is included in resources related to the PSSCH based on various embodiments proposed in the present disclosure. For example, the first SCI may be transmitted by using resources related to a PSCCH. For example, the second SCI may be transmitted by using resources related to the PSSCH.

Figure 15:
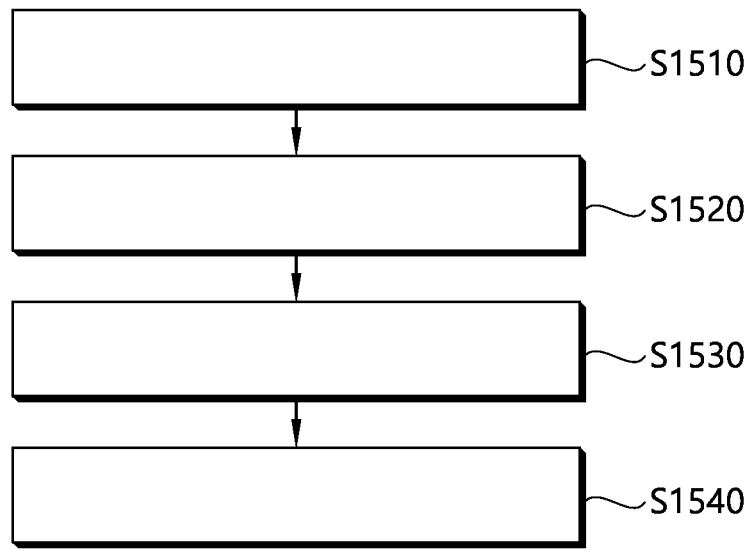
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, the first device may transmit, through a first physical sidelink control channel (PSCCH), a first sidelink control information (SCI) based on a first resources. In step S1520, the first device may transmit, through a first physical sidelink shared channel (PSSCH) related to the first PSCCH, a second SCI based on the first resource. Herein, at least one of the first SCI or the second SCI may include information related to a second resource, and a transport block (TB) may not be transmitted through the first PSSCH. In step S1530, the first device may transmit, to a second device through a second PSCCH, a first SCI based on the second resource. In step S1540, the first device may transmit, to the second device through a second PSSCH related to the second PSCCH, a second SCI and the TB based on the second resource.

For example, the first PSCCH and the first PSSCH may be transmitted to reserve the second resource. For example, a number of subchannels included in the first resource may be less than a number of subchannels included in the second resource. For example, the number of subchannels included in the first resource may be one. For example, the first SCI transmitted through the first PSCCH may include information informing that the TB is not transmitted through the first PSSCH.

For example, the first device may inform that the TB is not transmitted through the first PSSCH, based on a combination of information related to modulation and coding scheme (MCS) included in the first SCI transmitted through the first PSCCH and information related to redundancy version (RV) included in the second SCI transmitted through the first PSSCH. For example, the information related to the MCS may be 26, and the information related to the RV may be 1.

For example, the second SCI transmitted through the first PSSCH may be rate-matched on a resource related to the first PSSCH. For example, the second SCI transmitted through the first PSSCH may be mapped from N-th symbol to a last symbol on the resource related to the first PSSCH, and then mapped from $1^{st}$ symbol to (N−1)-th symbol on the resource related to the first PSSCH, and the $1^{st}$ symbol on the resource related to the first PSSCH may be a symbol related to automatic gain control (AGC), and the N may be a positive integer greater than or equal to 2. For example, the second SCI transmitted through the first PSSCH may be mapped from N-th symbol to a last symbol on the resource related to the first PSSCH, and then mapped from $2^{nd}$ symbol to (N−1)-th symbol on the resource related to the first PSSCH, and a specific value may be mapped to $1^{st}$ symbol on the resource related to the first PSSCH, and the $1^{st}$ symbol on the resource related to the first PSSCH may be a symbol related to automatic gain control (AGC), and the N may be a positive integer greater than or equal to 3. For example, the N-th symbol may be a symbol to which $1^{st}$ DMRS is mapped on the resource related to the first PSSCH. For example, the second SCI transmitted through the first PSSCH may be mapped from $2^{nd}$ symbol to a last symbol on the resource related to the first PSSCH, and a specific value may be mapped to $1^{st}$ symbol on the resource related to the first PSSCH, and the $1^{st}$ symbol on the resource related to the first PSSCH may be a symbol related to automatic gain control (AGC).

For example, the second SCI transmitted through the first PSSCH may be mapped from N-th symbol to (N+K)-th symbol on a resource related to the first PSSCH, and a specific value may be mapped to a resource to which the second SCI is not mapped among the resource related to the first PSSCH, and the N and the K may be positive integers.

The proposed method can be applied to the device(s) described below. First, the processor 102 of the first device 100 may control the transceiver 106 to transmit, through a first physical sidelink control channel (PSCCH), a first sidelink control information (SCI) based on a first resources. In addition, the processor 102 of the first device 100 may control the transceiver 106 to transmit, through a first physical sidelink shared channel (PSSCH) related to the first PSCCH, a second SCI based on the first resource. Herein, at least one of the first SCI or the second SCI may include information related to a second resource, and a transport block (TB) may not be transmitted through the first PSSCH. In addition, the processor 102 of the first device 100 may control the transceiver 106 to transmit, to a second device through a second PSCCH, a first SCI based on the second resource. In addition, the processor 102 of the first device 100 may control the transceiver 106 to transmit, to the second device through a second PSSCH related to the second PSCCH, a second SCI and the TB based on the second resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, through a first physical sidelink control channel (PSCCH), a first sidelink control information (SCI) based on a first resources; transmit, through a first physical sidelink shared channel (PSSCH) related to the first PSCCH, a second SCI based on the first resource, wherein at least one of the first SCI or the second SCI includes information related to a second resource, and wherein a transport block (TB) is not transmitted through the first PSSCH; transmit, to a second device through a second PSCCH, a first SCI based on the second resource; and transmit, to the second device through a second PSSCH related to the second PSCCH, a second SCI and the TB based on the second resource.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: transmit, through a first physical sidelink control channel (PSCCH), a first sidelink control information (SCI) based on a first resources; transmit, through a first physical sidelink shared channel (PSSCH) related to the first PSCCH, a second SCI based on the first resource, wherein at least one of the first SCI or the second SCI includes information related to a second resource, and wherein a transport block (TB) is not transmitted through the first PSSCH; transmit, to a second UE through a second PSCCH, a first SCI based on the second resource; and transmit, to the second UE through a second PSSCH related to the second PSCCH, a second SCI and the TB based on the second resource.

Based on an embodiment of the present disclosure, a non-transitory computer-readable storage medium storing instructions may be provided. For example, the instructions, when executed, may cause a first device to: transmit, through a first physical sidelink control channel (PSCCH), a first sidelink control information (SCI) based on a first resources; transmit, through a first physical sidelink shared channel (PSSCH) related to the first PSCCH, a second SCI based on the first resource, wherein at least one of the first SCI or the second SCI includes information related to a second resource, and wherein a transport block (TB) is not transmitted through the first PSSCH; transmit, to a second device through a second PSCCH, a first SCI based on the second resource; and transmit, to the second device through a second PSSCH related to the second PSCCH, a second SCI and the TB based on the second resource.

Figure 16:
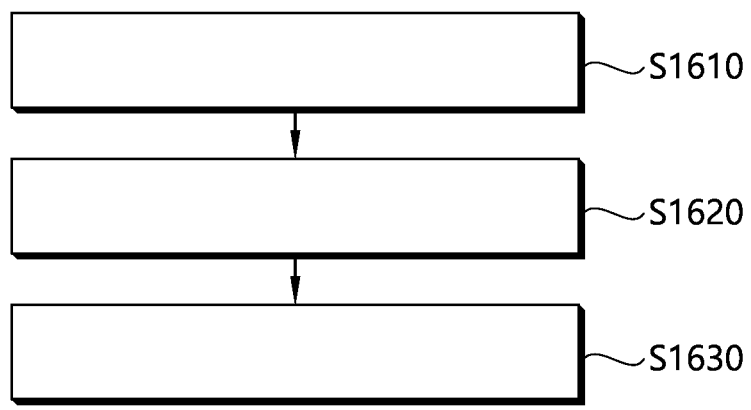
FIG. 16 shows a method for a second device to perform wireless communication, based on an embodiment of the present disclosure.

FIG. 16 shows a method for a second device to perform wireless communication, based on an embodiment of the present disclosure. The embodiment of FIG. 16 may be combined with various embodiments of the present disclosure.

Referring to FIG. 16, in step S1610, the second device may receive, from a first device through a first physical sidelink control channel (PSCCH), a first sidelink control information (SCI) based on a first resource. In step S1620, the second device may receive, from the first device through a first physical sidelink shared channel (PSSCH) related to the first PSCCH, a second SCI based on the first resource. Herein, at least one of the first SCI or the second SCI may include information related to a second resource, and a transport block (TB) may not be received through the first PSSCH. In step S1630, the second device may determine not to perform sidelink (SL) transmission on the second resource based on at least one of the first SCI or the second SCI.

The proposed method can be applied to the device(s) described below. First, the processor 202 of the second device 200 may control the transceiver 206 to receive, from a first device through a first physical sidelink control channel (PSCCH), a first sidelink control information (SCI) based on a first resource. In addition, the processor 202 of the second device 200 may control the transceiver 206 to receive, from the first device through a first physical sidelink shared channel (PSSCH) related to the first PSCCH, a second SCI based on the first resource. Herein, at least one of the first SCI or the second SCI may include information related to a second resource, and a transport block (TB) may not be received through the first PSSCH. In addition, the processor 202 of the second device 200 may determine not to perform sidelink (SL) transmission on the second resource based on at least one of the first SCI or the second SCI.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device through a first physical sidelink control channel (PSCCH), a first sidelink control information (SCI) based on a first resource; receive, from the first device through a first physical sidelink shared channel (PSSCH) related to the first PSCCH, a second SCI based on the first resource, wherein at least one of the first SCI or the second SCI includes information related to a second resource, and wherein a transport block (TB) is not received through the first PSSCH; and determine not to perform sidelink (SL) transmission on the second resource based on at least one of the first SCI or the second SCI.

Based on an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: receive, from a first UE through a first physical sidelink control channel (PSCCH), a first sidelink control information (SCI) based on a first resource; receive, from the first UE through a first physical sidelink shared channel (PSSCH) related to the first PSCCH, a second SCI based on the first resource, wherein at least one of the first SCI or the second SCI includes information related to a second resource, and wherein a transport block (TB) is not received through the first PSSCH; and determine not to perform sidelink (SL) transmission on the second resource based on at least one of the first SCI or the second SCI.

Based on an embodiment of the present disclosure, a non-transitory computer-readable storage medium storing instructions may be provided. For example, the instructions, when executed, may cause a second device to: receive, from a first device through a first physical sidelink control channel (PSCCH), a first sidelink control information (SCI) based on a first resource; receive, from the first device through a first physical sidelink shared channel (PSSCH) related to the first PSCCH, a second SCI based on the first resource, wherein at least one of the first SCI or the second SCI includes information related to a second resource, and wherein a transport block (TB) is not received through the first PSSCH; and determine not to perform sidelink (SL) transmission on the second resource based on at least one of the first SCI or the second SCI.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
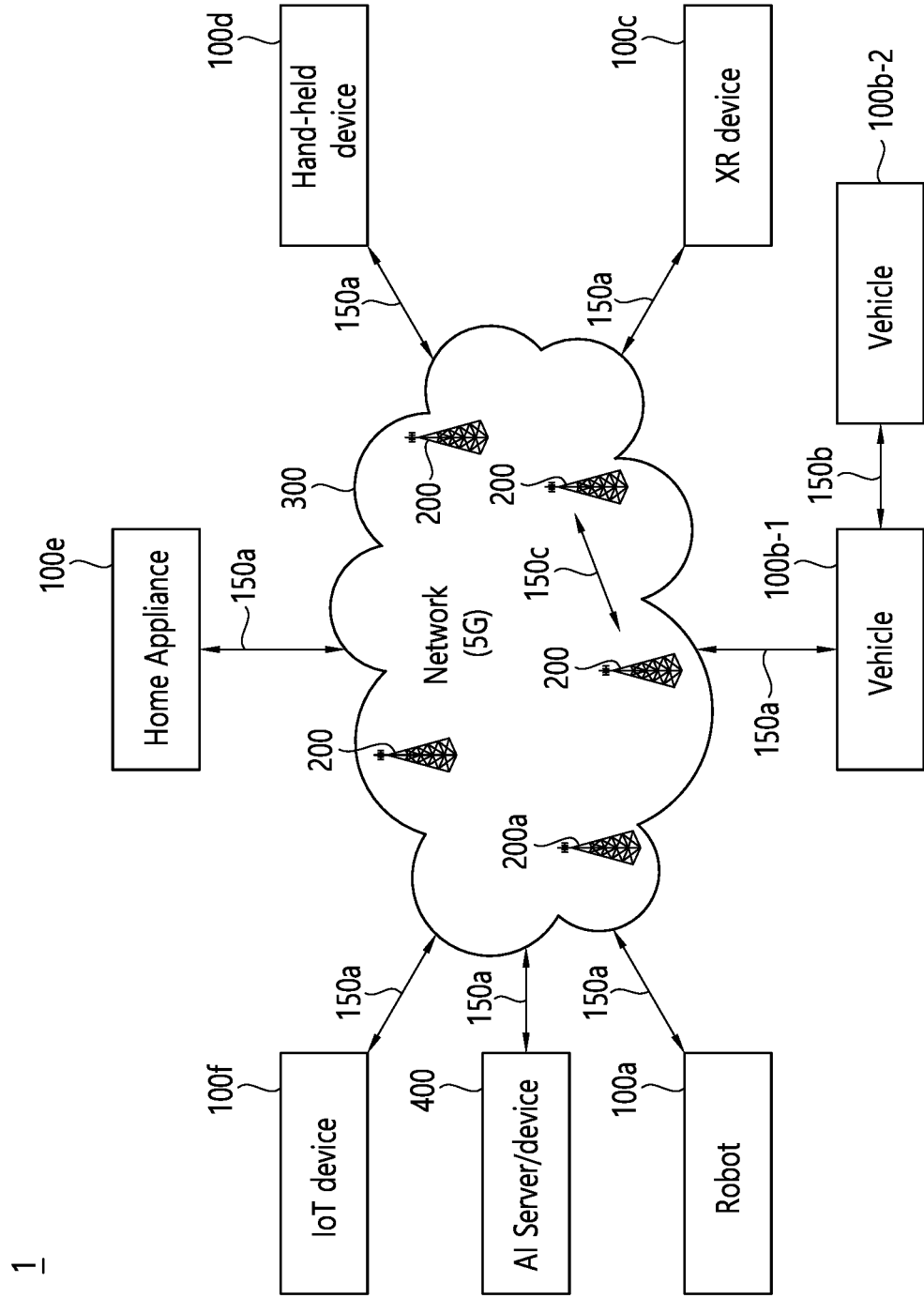
FIG. 17 shows a communication system 1, based on an embodiment of the present disclosure.

FIG. 17 shows a communication system 1, based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
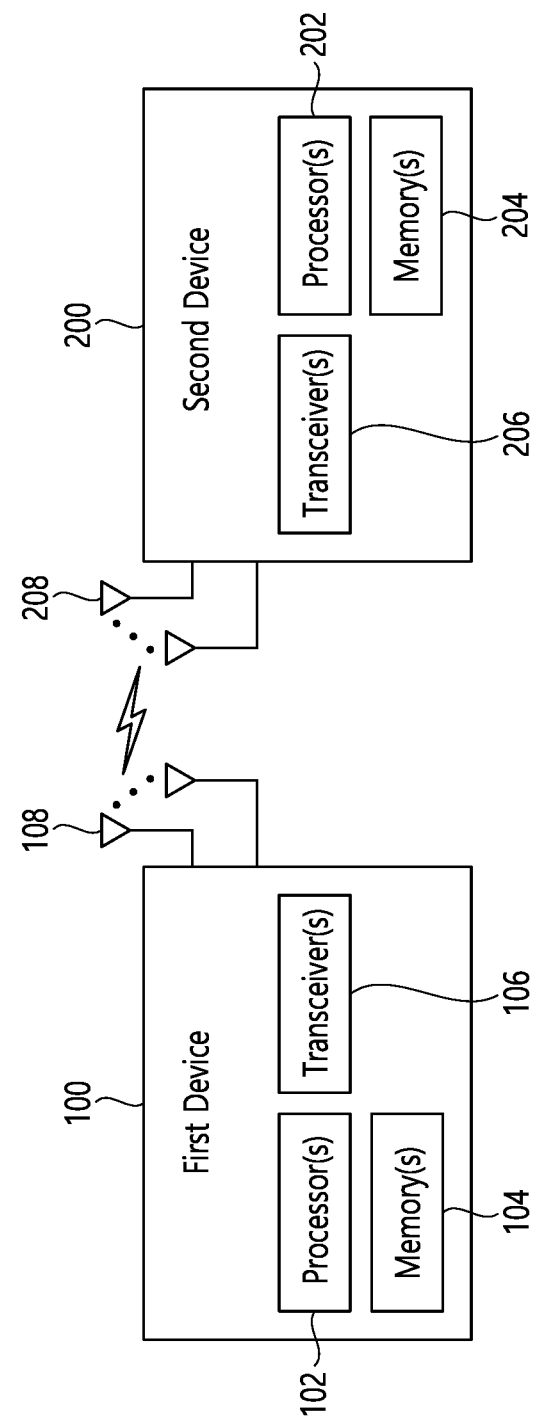
FIG. 18 shows wireless devices, based on an embodiment of the present disclosure.

FIG. 18 shows wireless devices, based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
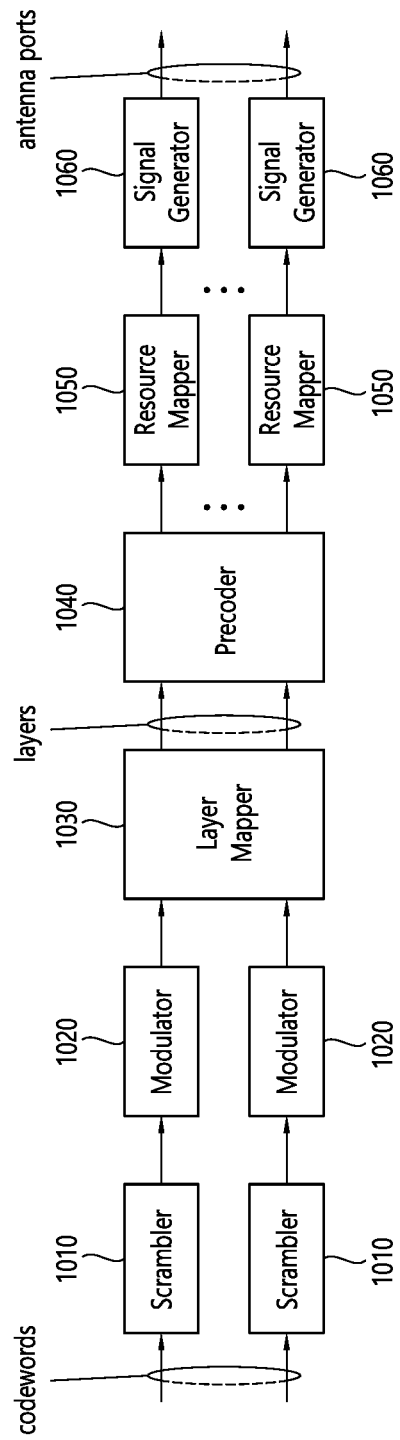
FIG. 19 shows a signal process circuit for a transmission signal, based on an embodiment of the present disclosure.

FIG. 19 shows a signal process circuit for a transmission signal, based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
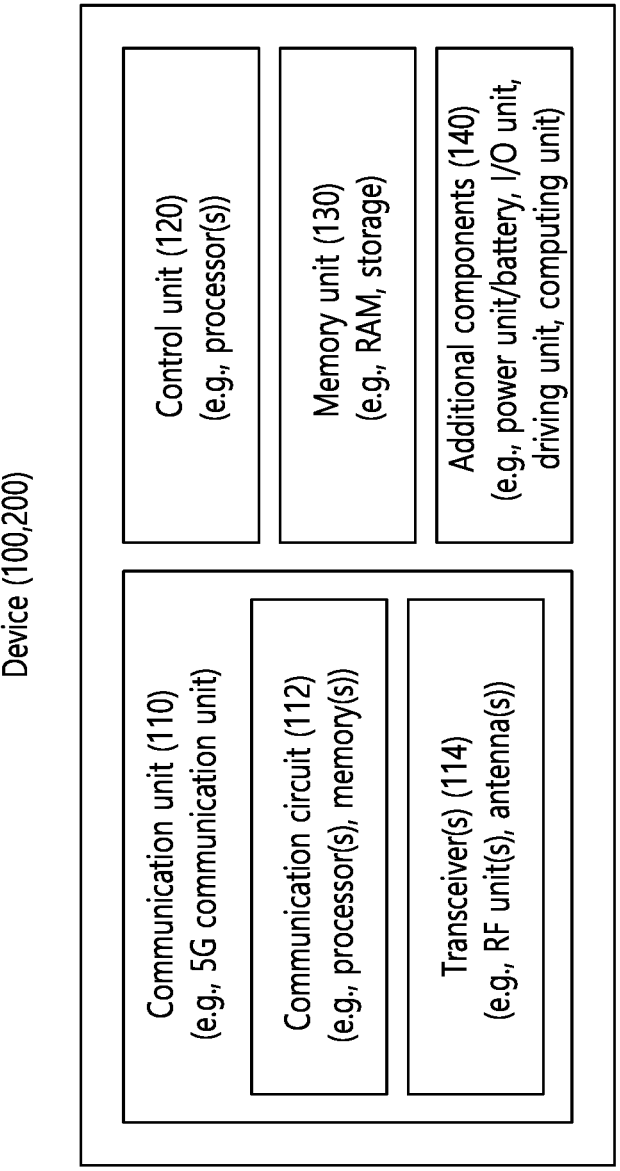
FIG. 20 shows another example of a wireless device, based on an embodiment of the present disclosure.

FIG. 20 shows another example of a wireless device, based on an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114.

For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
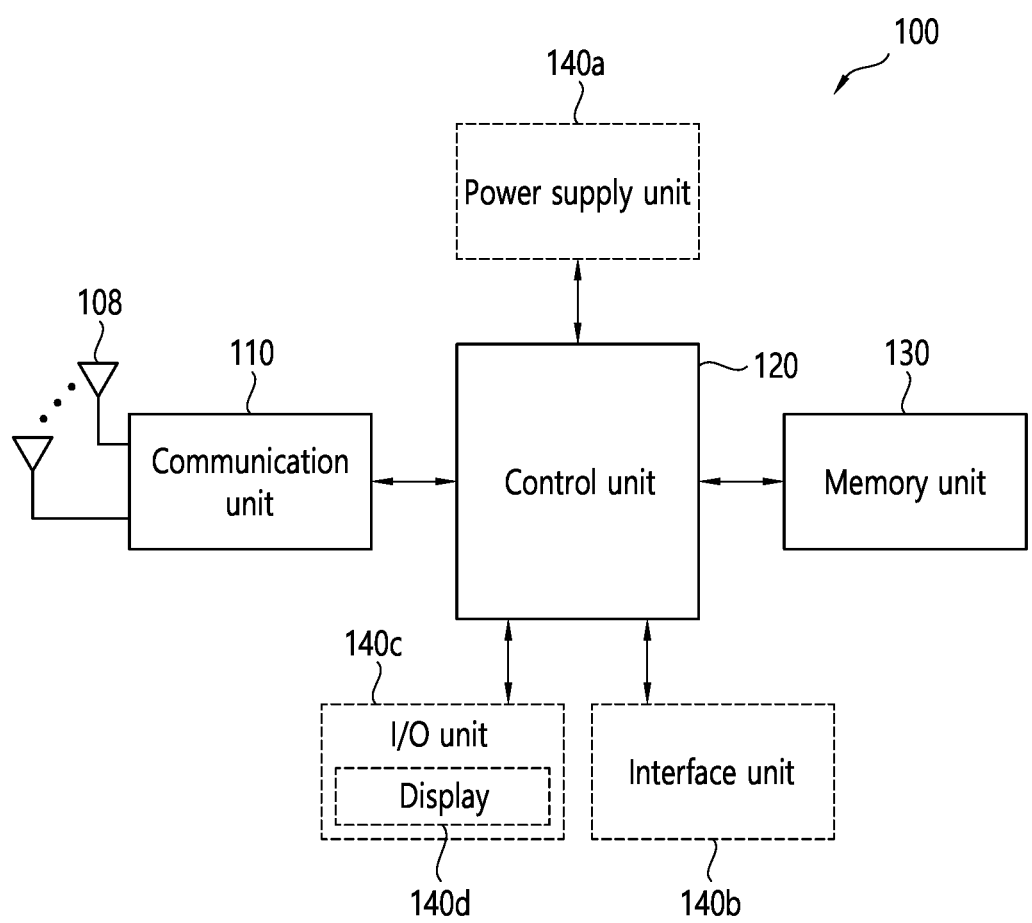
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
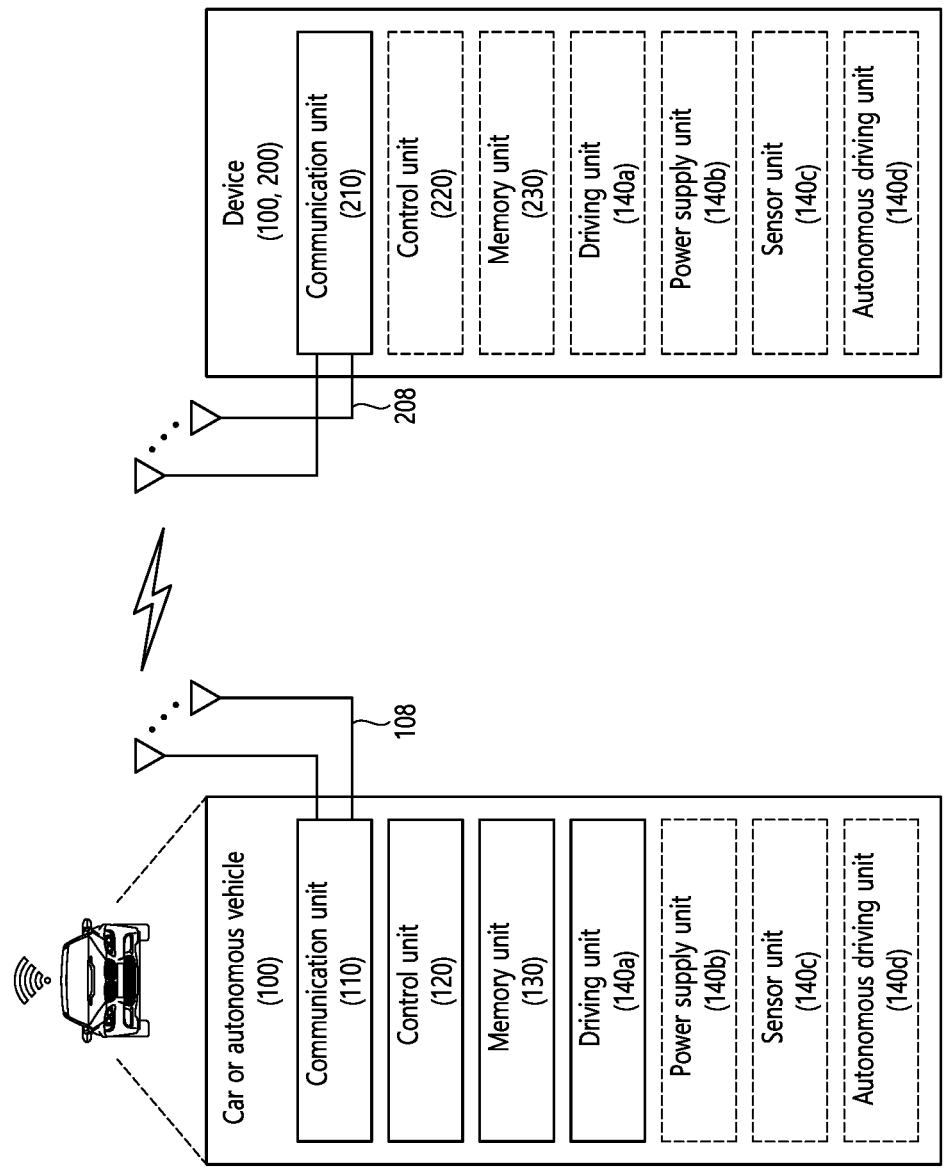
FIG. 22 shows a vehicle or an autonomous vehicle, based on an embodiment of the present disclosure.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    transmitting, through a first physical sidelink control channel (PSCCH), a first sidelink control information (SCI) based on a first resources;
    transmitting, through a first physical sidelink shared channel (PSSCH) related to the first PSCCH, a second SCI based on the first resource,
    wherein at least one of the first SCI or the second SCI includes information related to a second resource, and
    wherein a transport block (TB) is not transmitted through the first PSSCH;
    transmitting, to a second device through a second PSCCH, a third SCI based on the second resource; and
    transmitting, to the second device through a second PSSCH related to the second PSCCH, a fourth SCI and the TB based on the second resource.

2. The method of claim 1, wherein the first PSCCH and the first PSSCH are transmitted to reserve the second resource.

3. The method of claim 1, wherein a number of subchannels included in the first resource is less than a number of subchannels included in the second resource.

4. The method of claim 3, wherein the number of subchannels included in the first resource is one.

5. The method of claim 1, wherein the first SCI transmitted through the first PSCCH includes information informing that the TB is not transmitted through the first PSSCH.

6. The method of claim 1, wherein the first device informs that the TB is not transmitted through the first PSSCH, based on a combination of information related to modulation and coding scheme (MCS) included in the first SCI transmitted through the first PSCCH and information related to redundancy version (RV) included in the second SCI transmitted through the first PSSCH.

7. The method of claim 6, wherein the information related to the MCS is 26, and the information related to the RV is 1.

8. The method of claim 1, wherein the second SCI transmitted through the first PSSCH is rate-matched on a resource related to the first PSSCH.

9. The method of claim 8, wherein the second SCI transmitted through the first PSSCH is mapped from N-th symbol to a last symbol on the resource related to the first PSSCH, and then mapped from 1st symbol to (N−1)-th symbol on the resource related to the first PSSCH,
    wherein the 1st symbol on the resource related to the first PSSCH is a symbol related to automatic gain control (AGC), and
    wherein the N is a positive integer greater than or equal to 2.

10. The method of claim 8, wherein the second SCI transmitted through the first PSSCH is mapped from N-th symbol to a last symbol on the resource related to the first PSSCH, and then mapped from 2nd symbol to (N−1)-th symbol on the resource related to the first PSSCH,
    wherein a specific value is mapped to 1st symbol on the resource related to the first PSSCH, and
    wherein the 1st symbol on the resource related to the first PSSCH is a symbol related to automatic gain control (AGC), and
    wherein the N is a positive integer greater than or equal to 3.

11. The method of claim 10, wherein the N-th symbol is a symbol to which 1st DMRS is mapped on the resource related to the first PSSCH.

12. The method of claim 8, wherein the second SCI transmitted through the first PSSCH is mapped from 2nd symbol to a last symbol on the resource related to the first PSSCH,
    wherein a specific value is mapped to 1st symbol on the resource related to the first PSSCH, and
    wherein the 1st symbol on the resource related to the first PSSCH is a symbol related to automatic gain control (AGC).

13. The method of claim 1, wherein the second SCI transmitted through the first PSSCH is mapped from N-th symbol to (N+K)-th symbol on a resource related to the first PSSCH, wherein a specific value is mapped to a resource to which the second SCI is not mapped among the resource related to the first PSSCH, and wherein the N and the K are positive integers.

14. A first device configured to perform wireless communication, the first device comprising:
one or more memories storing instructions;
one or more transceivers; and
one or more processors connected to the one or more memories and the one or more transceivers, wherein the one or more processors execute the instructions to:
transmit, through a first physical sidelink control channel (PSCCH), a first sidelink control information (SCI) based on a first resources;
transmit, through a first physical sidelink shared channel (PSSCH) related to the first PSCCH, a second SCI based on the first resource,
wherein at least one of the first SCI or the second SCI includes information related to a second resource, and
wherein a transport block (TB) is not transmitted through the first PSSCH;
transmit, to a second device through a second PSCCH, a third SCI based on the second resource; and
transmit, to the second device through a second PSSCH related to the second PSCCH, a fourth SCI and the TB based on the second resource.

15. The first device of claim 14, wherein the first PSCCH and the first PSSCH are transmitted to reserve the second resource.

16. The first device of claim 14, wherein a number of subchannels included in the first resource is less than a number of subchannels included in the second resource.

17. The first device of claim 16, wherein the number of subchannels included in the first resource is one.

18. The first device of claim 14, wherein the first SCI transmitted through the first PSCCH includes information informing that the TB is not transmitted through the first PSSCH.

19. The first device of claim 14, wherein the first device informs that the TB is not transmitted through the first PSSCH, based on a combination of information related to modulation and coding scheme (MCS) included in the first SCI transmitted through the first PSCCH and information related to redundancy version (RV) included in the second SCI transmitted through the first PSSCH.

20. An apparatus configured to control a first user equipment (UE) performing wireless communication, the apparatus comprising:
one or more processors; and
one or more memories operably connected to the one or more processors and storing instructions, wherein the one or more processors execute the instructions to:
transmit, through a first physical sidelink control channel (PSCCH), a first sidelink control information (SCI) based on a first resources;
transmit, through a first physical sidelink shared channel (PSSCH) related to the first PSCCH, a second SCI based on the first resource,
wherein at least one of the first SCI or the second SCI includes information related to a second resource, and
wherein a transport block (TB) is not transmitted through the first PSSCH;
transmit, to a second UE through a second PSCCH, a third SCI based on the second resource; and
transmit, to the second UE through a second PSSCH related to the second PSCCH, a fourth SCI and the TB based on the second resource.

* * * * *